United States Patent
Zhao

(10) Patent No.: US 12,038,823 B2
(45) Date of Patent: Jul. 16, 2024

(54) HIERARCHICAL ATTENTION TIME-SERIES (HAT) MODEL FOR BEHAVIOR PREDICTION

(71) Applicant: INTUIT INC., Mountain View, CA (US)

(72) Inventor: Runhua Zhao, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 955 days.

(21) Appl. No.: 16/856,565

(22) Filed: Apr. 23, 2020

(65) Prior Publication Data

US 2021/0334190 A1 Oct. 28, 2021

(51) Int. Cl.
*G06F 11/34* (2006.01)
*G06F 3/04845* (2022.01)
*G06F 18/21* (2023.01)
*G06F 18/2113* (2023.01)
*G06F 18/214* (2023.01)
(Continued)

(52) U.S. Cl.
CPC ...... *G06F 11/3438* (2013.01); *G06F 3/04845* (2013.01); *G06F 18/2113* (2023.01); *G06F 18/214* (2023.01); *G06F 18/2163* (2023.01); *G06N 3/04* (2013.01); *G06N 3/08* (2013.01)

(58) Field of Classification Search
CPC ............ G06F 11/3438; G06F 3/04845; G06F 18/2113; G06F 18/214; G06F 18/2163; G06F 18/24133; G06F 2201/835; G06N 3/04; G06N 3/08; G06N 3/044; G06N 3/045
See application file for complete search history.

(56) References Cited

U.S. PATENT DOCUMENTS

| 7,164,791 B2* | 1/2007 | Cecala ................. G06F 18/214 |
| | | 382/159 |
| 10,776,699 B2* | 9/2020 | Das ...................... G06F 9/3893 |
| 2019/0129934 A1* | 5/2019 | Kadav .................. G06F 3/0604 |

OTHER PUBLICATIONS

Lyles, How to Write a Yelp Review on Desktop or Mobile, BusinessInsider.com, Jan. 2020 (Year: 2020).*
(Continued)

*Primary Examiner* — Aniss Chad
*Assistant Examiner* — Shien Ming Chou
(74) *Attorney, Agent, or Firm* — Patterson + Sheridan, LLP

(57) ABSTRACT

Aspects of the present disclosure provide techniques for behavior prediction. Embodiments include receiving activity data of a user, identifying user sessions comprising sets of time-stamped actions in the activity data, and segmenting the activity data into subsets corresponding to the user sessions. Embodiments include providing the subsets as inputs to a hierarchical attention time-series (HAT) model comprising: a first layer that determines attention scores for respective time-stamped actions in the subsets; and a second layer that determines attention scores for the subsets based on aggregations of the attention scores for the respective time-stamped actions. Embodiments include receiving, as outputs from the HAT model in response to the inputs: a prediction based on the subsets, the attention scores for the respective time-stamped actions, and the attention scores for the subsets; and explanatory information based on the attention scores for the respective time-stamped actions and the attention scores for the subsets.

14 Claims, 8 Drawing Sheets

(51) Int. Cl.
  *G06N 3/04* (2023.01)
  *G06N 3/08* (2023.01)

(56) References Cited

OTHER PUBLICATIONS

He, Detecting Session Boundaries from Web User Logs, School of Computer and Mathematical Science, the Robert Gordon University, 2000 (Year: 2000).*

Xing, A Hierarchical attention model for rating prediction by leveraging user and product reviews, Neurocomputing, 2018 (Year: 2018).*

* cited by examiner

HIERARCHICAL ATTENTION TIME-SERIES (HAT) MODEL FOR BEHAVIOR PREDICTION

INTRODUCTION

Aspects of the present disclosure relate to techniques for behavior prediction using a hierarchical attention time-series (HAT) model.

BACKGROUND

The ability to predict user behavior is an important feature of some computing applications.

Many conventional techniques for predicting user behavior involve the use of machine learning models that evaluate each user action independently of other actions, such as in a serial manner, when making predictions. As such, these techniques may be inefficient and may produce suboptimal results due to inordinate weight being given to certain user actions without understanding the full context of the user actions. Furthermore, conventional techniques may involve machine learning models that operate as a sort of "black box" that provides no details of how a prediction is determined.

Accordingly, there is a need in the art for improved techniques for predicting user behavior in an accurate and explainable manner.

BRIEF SUMMARY

Certain embodiments provide a method. The method generally includes: receiving activity data of a user; identifying user sessions comprising sets of time-stamped actions in the activity data; segmenting the activity data into subsets corresponding to the user sessions; providing the subsets as inputs to a hierarchical attention time-series (HAT) model comprising: a first layer that determines attention scores for respective time-stamped actions in the subsets; and a second layer that determines attention scores for the subsets based on aggregations of the attention scores for the respective time-stamped actions; and receiving, as outputs from the HAT model in response to the inputs: a prediction based on the subsets, the attention scores for the respective time-stamped actions, and the attention scores for the subsets; and explanatory information based on the attention scores for the respective time-stamped actions and the attention scores for the subsets.

Other embodiments provide a system comprising one or more processors and a non-transitory computer-readable medium comprising instructions that, when executed by the one or more processors, cause the system to perform a method. The method generally includes: receiving activity data of a user; identifying user sessions comprising sets of time-stamped actions in the activity data; segmenting the activity data into subsets corresponding to the user sessions; providing the subsets as inputs to a hierarchical attention time-series (HAT) model comprising: a first layer that determines attention scores for respective time-stamped actions in the subsets; and a second layer that determines attention scores for the subsets based on aggregations of the attention scores for the respective time-stamped actions; and receiving, as outputs from the HAT model in response to the inputs: a prediction based on the subsets, the attention scores for the respective time-stamped actions, and the attention scores for the subsets; and explanatory information based on the attention scores for the respective time-stamped actions and the attention scores for the subsets.

Other embodiments provide a method. The method generally includes: receiving activity data of a plurality of users; identifying user sessions comprising sets of time-stamped actions in the activity data; segmenting the activity data into subsets corresponding to the user sessions; associating the subsets with labels based on whether given users of the plurality of users performed a given action; and using the subsets and the labels to train a hierarchical attention time-series (HAT) model comprising: a first layer that determines attention scores for respective time-stamped actions in the subsets; a second layer that determines attention scores for the subsets based on aggregations of the attention scores for the respective time-stamped actions; and an output layer configured to output: a prediction corresponding to the given action that is based on respective actions that are provided as inputs to the HAT model and outputs from the first layer and the second layer; and explanatory information based on the outputs from the first layer and the second layer.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
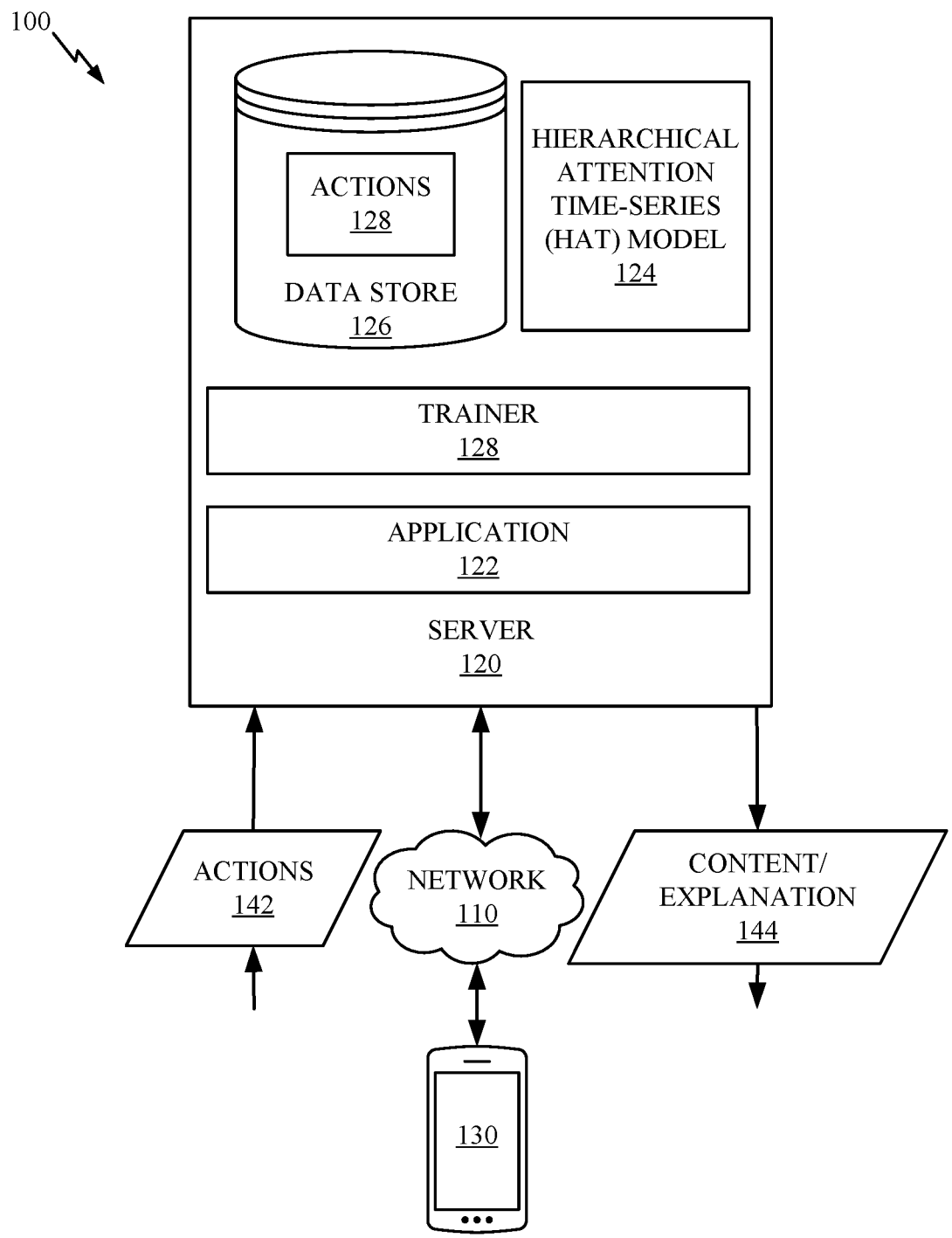
FIG. 1 depicts an example computing environment for behavior prediction using a hierarchical attention time-series (HAT) model.

Aspects of the present disclosure provide apparatuses, methods, processing systems, and computer readable mediums for behavior prediction using a hierarchical attention time-series (HAT) model.

Computing applications may utilize user activity data to predict future user behavior. For example, an application may utilize historical actions of a user within the application to predict whether or not the user is likely to perform future actions, such as seeking assisted support, discontinuing use of a product, or purchasing additional products or services. These predictions may be used to provide the user with targeted content, proactively resolve issues, forecast future costs and revenue, and the like. For example, machine learning techniques may be used to train a model for behavior prediction based on past correlations between user actions within an application and subsequent behavior related to use of the application.

Embodiments of the present disclosure use a hierarchical attention time-series (HAT) model to predict user behavior efficiently, accurately, and in a manner that is explainable. As described in more detail below, the HAT model is efficient in that it allows activity data to be processed in parallel, which improves processing speed compared to conventional methods. Further, the HAT model is more accurate than conventional models because it contextualizes each user action based on other adjacent actions. Further, the HAT model produces explainable results, which in some embodiments include model output attention scores that indicate which features in the input data contributed most significantly to the ultimate prediction.

In particular, a HAT model may be a neural network including attention layers, arranged hierarchically, that processes time-stamped user activity data for prediction of future user behavior. Neural networks generally include a plurality of connected units or nodes called artificial neurons. Each node generally has one or more inputs with associated weights, a net input function, and an activation function. Nodes are generally included in a plurality of connected layers, where nodes of one layer are connected to nodes of another layer, with various parameters governing the relationships between nodes and layers and the operation of the neural network.

HAT models may include attention layers, which generally involve focusing on certain subsets of data with "high resolution" while perceiving the rest of the data in "low resolution", and adjusting the focal point over time.

Inputs to a HAT model may include time-stamped user activity data that has been segmented into sets that correspond to user sessions, such as separate instances of a user logging into an application. Embodiments of the HAT models described herein determine attention scores for each user action within each user session at a first hierarchical level, and then determine an attention score for each user session, based on the attention scores for the user actions, at a second hierarchical level. The attention scores for the user actions and user sessions, being separately determined at different hierarchical levels, allow the model to output a prediction and explanatory information regarding the prediction so that a user can determine which actions and/or sessions contributed most to the prediction.

Example Computing Environment

FIG. 1 illustrates an example computing environment 100 for behavior prediction using a hierarchical attention time-series (HAT) model.

Computing environment 100 includes a server 120 and a client 130 connected over network 110. Network 110 may be representative of any type of connection over which data may be transmitted, such as a wide area network (WAN), local area network (LAN), cellular data network, and/or the like.

Server 120 generally represents a computing device such as a server computer. Server 120 includes an application 122, which generally represents a computing application that a user interacts with over network 110 via client 130. In some embodiments, application 122 is accessed via a user interface associated with client 130. In one example, application 122 is a financial services application such as a tax preparation application.

Server 120 further includes hierarchical attention time-series (HAT) model 124, which generally represents a machine learning model that is used for predicting user behavior according to techniques described herein. In some embodiments, model 124 is a neural network model that calculates attention scores for user actions and sessions at different hierarchical levels and outputs predictions along with explanatory information regarding the predictions. As described in more detail below with respect to FIG. 2, HAT model 124 may comprise multiple layers, including an input layer (e.g., which may be an embedding layer), a first attention layer that calculates attention scores for actions, a first hidden layer that processes the input actions based on their attention scores, a second attention layer that calculates attention scores for sessions, a second hidden layer that processes sessions based on their attention scores, and an output layer that outputs one or more predictions along with explanatory data based on the attention scores from the attention layers. It is noted that attention layers are also, in the terminology of neural networks, hidden layers, but are referred to herein separately from other hidden layers in order to emphasize their function of determining attention scores.

Data store 126 generally represents a data storage entity such as a database or repository that stores actions 128. Actions 128 generally represent user activities within application 122, such as clickstream data, search history, support interactions, purchase history, and the like. In some embodiments, actions 128 are associated with metadata such as timestamps and application context data (e.g., a page on which an action was performed). In some embodiments, actions 128 include actions of a plurality of users, including a user of client 130 and users of other client devices. As such, actions 128 are gathered from a plurality of different computing systems through which users interact with application 122. In some embodiments, actions 128 include "log in" and "log out" actions that may be used to delineate beginnings and endings of user sessions with an application, such as application 122. Actions 128 may be used to generate training data for use in training HAT model 124.

In certain embodiments, HAT model 124 is trained based on a training data set that includes labeled sets of actions, a given label indicating whether a given set of actions was associated with a particular outcome. For example, a training data instance may include one or more sets of activity data corresponding to sessions of a given user and a label that indicates whether the user performed a subsequent action (e.g., purchased a product or service, discontinued use of the application, sought assisted support, or the like) following the actions in the activity data. Labels in the training data may have been assigned by subject matter experts and/or may have been automatically determined based on user activity data, such as whether users performed subsequent actions.

Trainer 128 generally performs operations related to training HAT model 124. In some embodiments, training HAT model 124 involves providing training inputs (e.g., sets of activities) to nodes of an input layer of HAT model 124. HAT model 124 processes the training inputs through its various layers and outputs predictions (e.g., in the form of confidence scores for each of one or more potential subsequent user actions, such as purchasing a given product). The predictions are compared to the labels associated with the training inputs to determine the accuracy of HAT model 124, and parameters of HAT model 124 are iteratively adjusted until one or more conditions are met. For example, the conditions may relate to whether the predictions produced by HAT model 124 based on the training inputs match the labels associated with the training inputs or whether a measure of error between training iterations is not decreasing or not decreasing more than a threshold amount. The conditions may also include whether a training interaction limit has been reached. Parameters adjusted during training may include, for example, hyperparameters, values related to numbers of iterations, weights, functions used by attention nodes to calculate attention scores, and the like. In some embodiments, validation and testing are also performed for HAT model 124, such as based on validation data and test data, as is known in the art.

Client 130 generally represents a computing device such as a mobile phone, laptop or desktop computer, tablet computer, or the like. Client 130 is used to access application 122 over network 110, such as via a user interface associated with client 130. In alternative embodiments, application 122 (and, in some embodiments HAT model 124) runs directly on client 130.

In one example, actions 142 performed via client are received by server 120, such as based on input received via the user interface, which is described in one example below with respect to FIG. 3A. Actions 142 may include, for example, clicks, text input, searches, assisted support interactions, logins, logouts, purchases, and the like. Actions 142 are processed by application 122, which uses HAT model 124 to predict user behaviors based on actions 142 and to provide explanatory information regarding the predictions.

In certain embodiments, an embedding layer of HAT model 124 is used to determine representations of each of actions 142, each representation comprising a vector of n values defining a point in n-dimensional space that represents the action (e.g., relative to other actions). Embeddings are described in more detail below with respect to FIG. 2.

HAT model 124 determines attentions scores for each of actions 142 and attention scores for each subset of actions 142 that corresponds to a different session. HAT model 124 outputs predictions based on the representations of actions 142 and their attention scores, along with explanatory information related to the predictions. For example, the model may output a confidence score for each of one or more potential future user actions, and may also output explanatory information based on the attention scores (e.g., identifying which actions and/or sessions contributed most to the confidence scores). The predictions are then used by application 122 to provide content and explanations to client 130.

For example, application 122 may determine to recommend a certain item of help content to the user based on a prediction that the user will seek assisted support for a certain issue, and provide the item of help content to client 130 for display via the user interface of a client-side component of application 122. The explanation may, for example, indicate that the item of help content is being recommended to the user based on certain actions 142 performed by the user (e.g., as indicated by attention scores for those actions being above a threshold).

Example Hierarchical Attention Time-Series (HAT) Model for Behavior Prediction

Figure 2A:
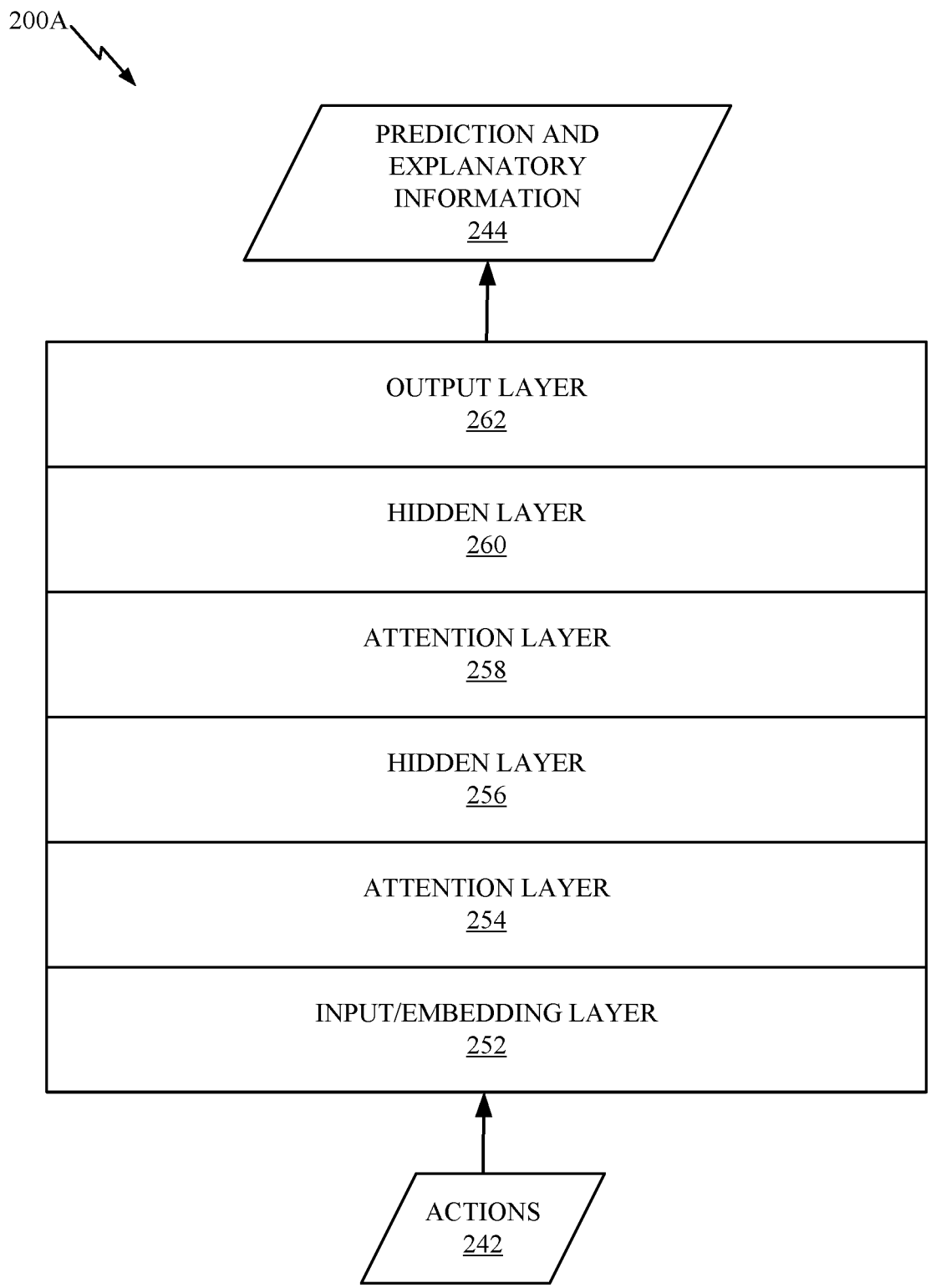
FIG. 2A depicts an example HAT model for behavior prediction.

FIG. 2A depicts an example embodiment 200A of a HAT model for behavior prediction. In particular, embodiment 200A illustrates aspects of HAT model 124 of FIG. 1. Embodiment 200A provides a high-level view of an example architecture of a HAT model that is described in more detail with respect to FIG. 2B.

In embodiment 200A, a HAT model includes an input/embedding layer 252 that accepts actions 242 as input values and generates vector representations of each action in actions 242. In some embodiments, as described in more detail below with respect to FIG. 2B, actions 242 are time-stamped user actions that are segmented by session, and the embeddings are n-dimensional vectors representing actions as vectors in n-dimensional space.

The HAT model further includes an attention layer 245 that determines attention scores for each action within each session based on the embeddings of actions 242 generated by input/embedding later 252.

The HAT model further includes a hidden layer 256 that applies one or more functions to the embeddings of actions 242 based on the attention scores output by attention layer 254. As described in more detail below with respect to FIG. 2B, the attention scores for actions are used to place more emphasis on actions considered more important to a potential output label.

The HAT model further includes another attention layer 258 that determines attention scores for sessions based on the attention scores for the actions within the sessions that were output by attention layer 254.

The HAT model further includes another hidden layer 260 that applies one or more functions to aggregations of the embeddings of actions 242 (e.g., aggregated into sessions) based on the attention scores output by attention layer 258. As described in more detail below with respect to FIG. 2B, the attention scores for sessions are used to place more emphasis on sessions considered more important to the potential output label.

The HAT model further includes an output layer 262 that outputs a prediction and explanatory information 244 based on outputs from layers 254-260. As described in more detail below with respect to FIG. 2B, the prediction may indicate whether a user is likely to perform a future action, and the explanatory information may indicate which actions and/or sessions contributed most to the prediction based on the attention scores.

Figure 2B:
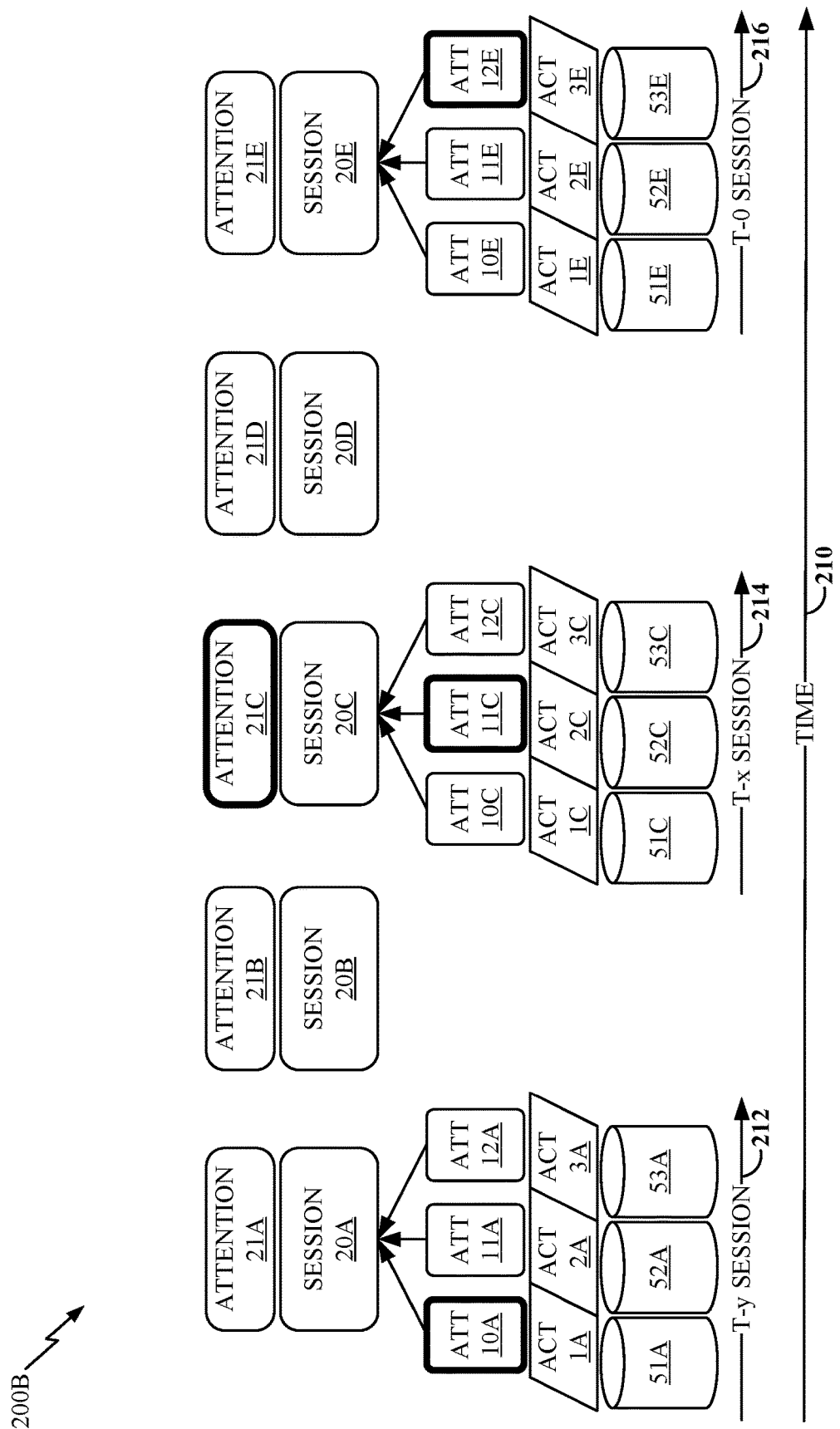
FIG. 2B depicts an example embodiment of using a HAT model for behavior prediction.

FIG. 2B depicts an example embodiment 200B of using a HAT model for behavior prediction. In particular, embodiment 200B illustrates attention nodes of a HAT model that calculate attention scores for actions and sessions at different hierarchical levels.

The hierarchical aspect of the HAT model means that sequential user actions are first segmented into sessions based on natural user login sessions to an application, processed in parallel to determine attention scores for actions, and aggregated to an upper level corresponding to sessions in a hierarchical manner. Such a process can be performed in a recursive manner, and upper level latent representations can be combined into a new sequence and processed similarly at the lower level. For example, within each session, the action sequence may be consumed by a LSTM (long-short-term memory) module. Similarly, the upper level latent representations of sessions can also be viewed as a sequential (abstract) action sequence, and another LSTM module may be used to obtain the final prediction using the entire upper level action sequence.

Attention stands for a method of consolidating latent representations (e.g., embeddings) of time-series segments (e.g., including time-stamped actions corresponding to sessions). Attention mechanisms allow a model to dynamically calculate the importance of each latent representation, learned through the iterative training process described above, and available to be called upon to analyze model decision processes. The attention scores are explicit values distributed across all actions within a given sequence. These scores provide a clue for analysts to understand how the model reaches the decision, and which session/actions contribute the most towards that decision.

The process depicted in embodiment 200 may be executed recursively from lower to higher levels (e.g., from attention layer 254 to attention layer 258 of FIG. 2A), using attention scores to put more weight on important latent representations across multiple sessions and less weight on less important latent representations. The aggregated latent representations of actions may be combined with other features (e.g., user attributes) and used along with the attention scores to make one or more predictions.

An embedding layer of the model generally determines latent representations of actions. For example, actions may be provided to the embedding layer as integers (e.g., indices assigned to actions), and the embedding layer may embed the actions as vectors in n-dimensional space relative to one another, represented as n-dimensional vectors.

In embodiment 200, time is represented by axis 210. Sessions 212, 214, and 216 are temporal representations of a subset of sessions 20A-E, and are included to illustrate that sessions 20A-E took place consecutively over time. For example, sessions 20A-E may represent five separate instances where the user logged into application 122 of FIG. 1, and may be the five most recent sessions of the user. Each of sessions 20A-E includes a plurality of time-stamped actions. For example, session 20A includes actions 1A, 2A, and 3A, session 20C includes actions 1C, 2C, and 3C, and session 20E includes actions 1E, 2E, and 3E. Sessions 20A-E may represent subsets of actions 142 of FIG. 1 segmented based on sessions, such as based on login actions that delineate the beginnings of sessions and logout actions that delineate the end of sessions.

In embodiment 200, a plurality of attention nodes 10A, 11A, 12A, 10C, 11C, 12C, 10E, 11E, and 12E run on separate processing components 51A, 52A, 53A, 51C, 52C, 53C, 51E, 52E, and 53E, and process individual actions of sessions 20A, 20C, and 20E. While not shown, additional attention nodes may run on additional processing components and process individual actions of sessions 20B and 20D in a similar way.

Each processing component may be a separate physical processor (e.g., central processing unit) or may be a software component that performs processing functions, such as a processor thread. It is noted that processing components 51A, 52A, 53A, 51C, 52C, 53C, 51E, 52E, and 53E are included as an example of how embodiments of the present disclosure may be implemented in a distributed manner so that processing may be performed in parallel for multiple actions. For example, a distributed computing platform such as Apache® Spark™ may be used to distribute processing. In alternative embodiments, fewer or more processing components may be used. For instance, more than one attention module may alternatively run on a single processing component.

Attention nodes 10A, 11A, 12A, 10C, 11C, 12C, 10E, 11E, and 12E represent neurons in a first attention layer of HAT model 124 of FIG. 1 (e.g., attention layer 254 of FIG. 2B) that calculate attention scores for individual actions. An attention layer learns the importance of a given action based on context of the action, such as based on actions immediately preceding and immediately following the given action. Rather than applying a fixed weight to a given action, an attention node applies an attention function to the given action to dynamically determine an importance of the action. The attention function, which may be referred to as f(X), where X is a latent representation of the given action. In one example, rather than calculating an importance of an action, H, using the conventional formula H=WX+b, where W is a weight and b is a bias, embodiments of the present disclosure may involve using the modified formula H=f(X)+b. In techniques described herein, H is an attention score. Within a given session, the attention scores of all actions will sum to 1. For example, the attention scores calculated by attention modules 10A, 11A, and 12A will add up to 1, the attention scores calculated by attention modules 10C, 11C, and 12C will add up to 1, and the attention scores calculated by attention modules 10E, 11E, and 12E will add up to 1. In embodiment 200, the attention scores calculated by attention nodes 10A, 11C, and 12E are the highest in their respective sessions, and so actions 1A, 2C, and 3E are considered most important to an ultimate prediction of the model.

Attention nodes 21A-21E may represent neurons of a second attention layer of HAT model 124 of FIG. 1 (e.g., attention layer 258 of FIG. 2B) that determine attention scores for sessions. There may be a first hidden layer (e.g., hidden layer 256 of FIG. 2B) between the first attention layer and the second attention layer, and the first hidden layer may use the attention scores from the first attention layer to process actions (e.g., applying one or more functions in order to determine confidence scores for one or more potential output labels for each action, using attention scores to emphasize more important actions and de-emphasize less important actions). The second attention layer calculates attention scores for sessions 20A-E based on the attention scores for the actions within the sessions.

For example, attention node 21A may aggregate attention scores for actions 1A, 2A, and 3A to determine an attention score for session 20A in a similar manner to that used by the first attention layer. For example, H=f(X)+b may be used to calculate the attention score for session 20A, where X represents an aggregated representation of session 20A based on the representations of actions 1A, 2A, and 3A and the attention scores calculated at attention nodes 10A, 11A, and 12A. It is noted that the attention scores for sessions may not only be based on the most important actions within the session, but may take into account all actions in the session, such as by weighting the actions differently based on importance. In embodiment 200, the attention score calculated by attention node 21C is the highest, indicating that session 20C is determined to be the most important session.

Attention scores calculated by attention nodes 21A-E are used in a second hidden layer (e.g., hidden layer 260 of FIG. 2B) to process aggregated representations of sessions 20A-E. For example, the second hidden layer may calculate a confidence score with respect to each of one or more potential output labels for an aggregated representation of each of sessions 20A-E, using the attention scores for sessions 20A-E to emphasize more important sessions and de-emphasize less important sessions.

Confidence scores calculated in the model are used to determine whether each of one or more output labels (e.g., indicating whether the user is likely to perform a given subsequent action) are predicted for the user. The model outputs one or more predictions along with explanatory information that indicates which actions and/or sessions contributed most to the predictions based on the attention scores, such as via output layer 262 of FIG. 2B. In embodiment 200, explanatory information may indicate that actions 1A, 2C, and 3E and session 20C contributed most to the predictions.

A prediction output by the HAT model may, for example indicate that the user is likely to seek assisted support related to itemized deductions. The prediction may be output in the form of a confidence score, which may be above a threshold. The model may also output the attention scores for the actions and sessions in order to explain why the prediction was determined. For example, as described below with respect to FIG. 3, the user may be provided with content based on the prediction, along with an explanation of why the content is being recommended based on the attention scores. The attention scores also allow the model's reasoning process to be understood, such as by an administrator, thereby providing transparency. For example, a summary of a group of high churn risk user's attention scores can be viewed as a kind of analysis report, helping to identify where issues may reside. This can help an administrator to take not only personal proactive actions for individual users, but also to make macro level business strategy changes to mitigate risk, increase user engagement, and increase product lifetime value to the customer.

The layers, nodes, connections, and formulas described with respect to embodiment 200 are only included as an example, and other arrangements are possible.

Examples of Providing Content Based on an Explainable Prediction

Figure 3A:
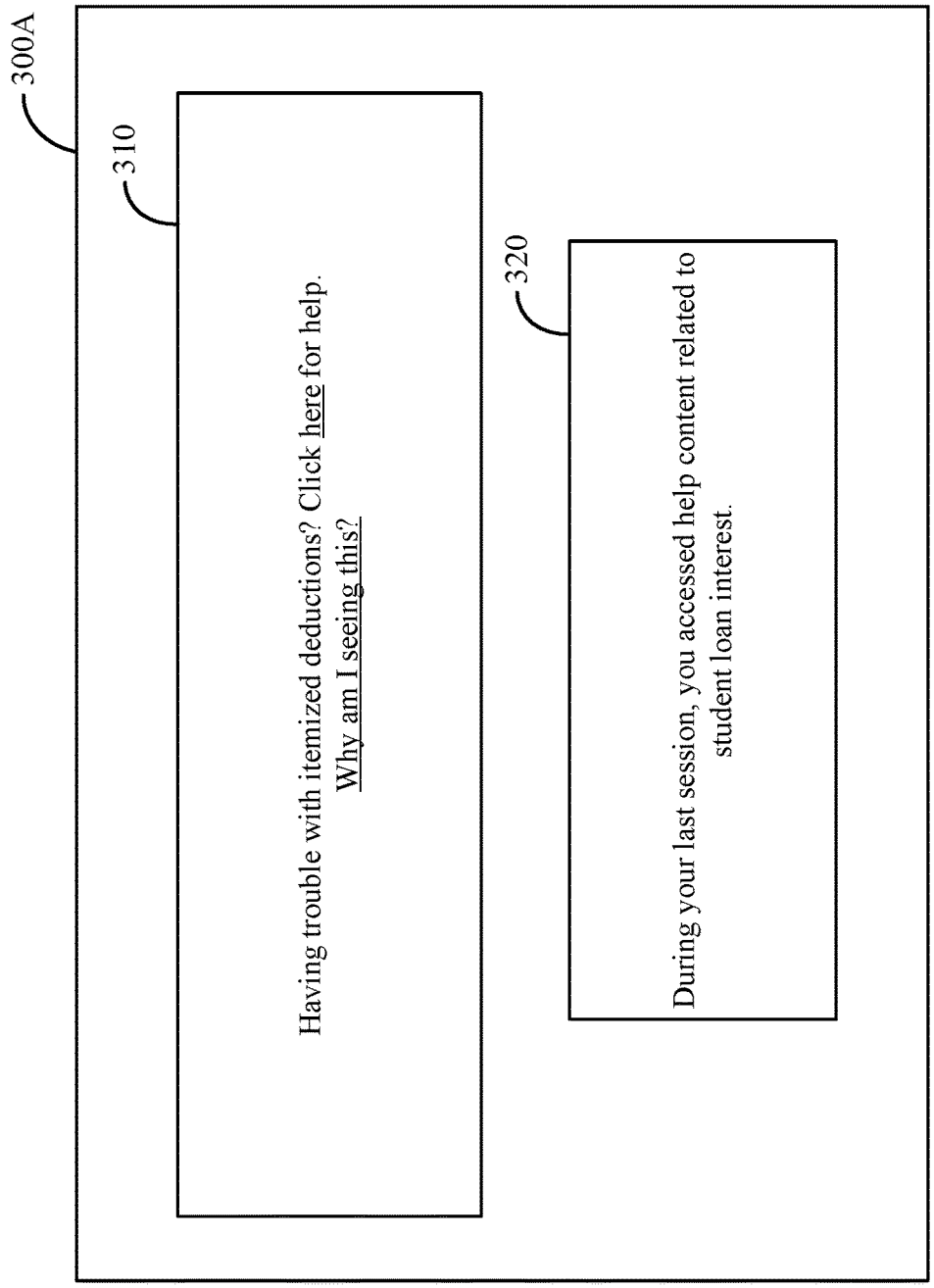
FIG. 3A depicts an example of providing content based on an behavior prediction.

FIG. 3A depicts an example of providing content to a user within a user interface 300A based on an explainable prediction determined using a HAT model. For example, the prediction may have been determined by HAT model 124 of FIG. 1 based on actions 142 of FIG. 1 as described above with respect to FIGS. 1 and 2.

In an embodiment, user interface 300A is accessed by a user on client 130 of FIG. 1, and corresponds to application 122 of FIG. 1. A recommendation 310 and an explanation 320 are provided within user interface 300A. Recommendation 310 and explanation 320 may correspond to content/explanation 144 of FIG. 1, and may be provided to client 130 from server 120 of FIG. 1 based on actions 142 of FIG. 1. For example application 122 of FIG. 1 may have determined to provide recommendation 310 based on a prediction output from HAT model 124 of FIG. 1 indicating that the user is likely to seek assisted support for an issue related to itemized deductions. Recommendation 310 includes the text "Having trouble with itemized deductions? Click here for help." Clicking on the word "here" may load help content related to itemized deductions, launch an automated support session related to itemized deductions, or the like. Recommendation 310 also includes a link with the text "Why am I seeing this?" that, when activated by the user, causes explanation 320 to be displayed.

Explanation 320 includes explanatory text that is based on explanatory information (e.g., attention scores) output by the HAT model. Explanation 320 states "During your last session, you accessed help content related to student loan interest." For example, an attention score for the user's most recent session may have been above a threshold, and an attention score for an action within that session indicating that the user accessed help content related to student loan interest may have been above a threshold. The explanatory text in explanation 320 may be automatically generated based on the attention scores, such as using an explanation template.

Figure 3B:
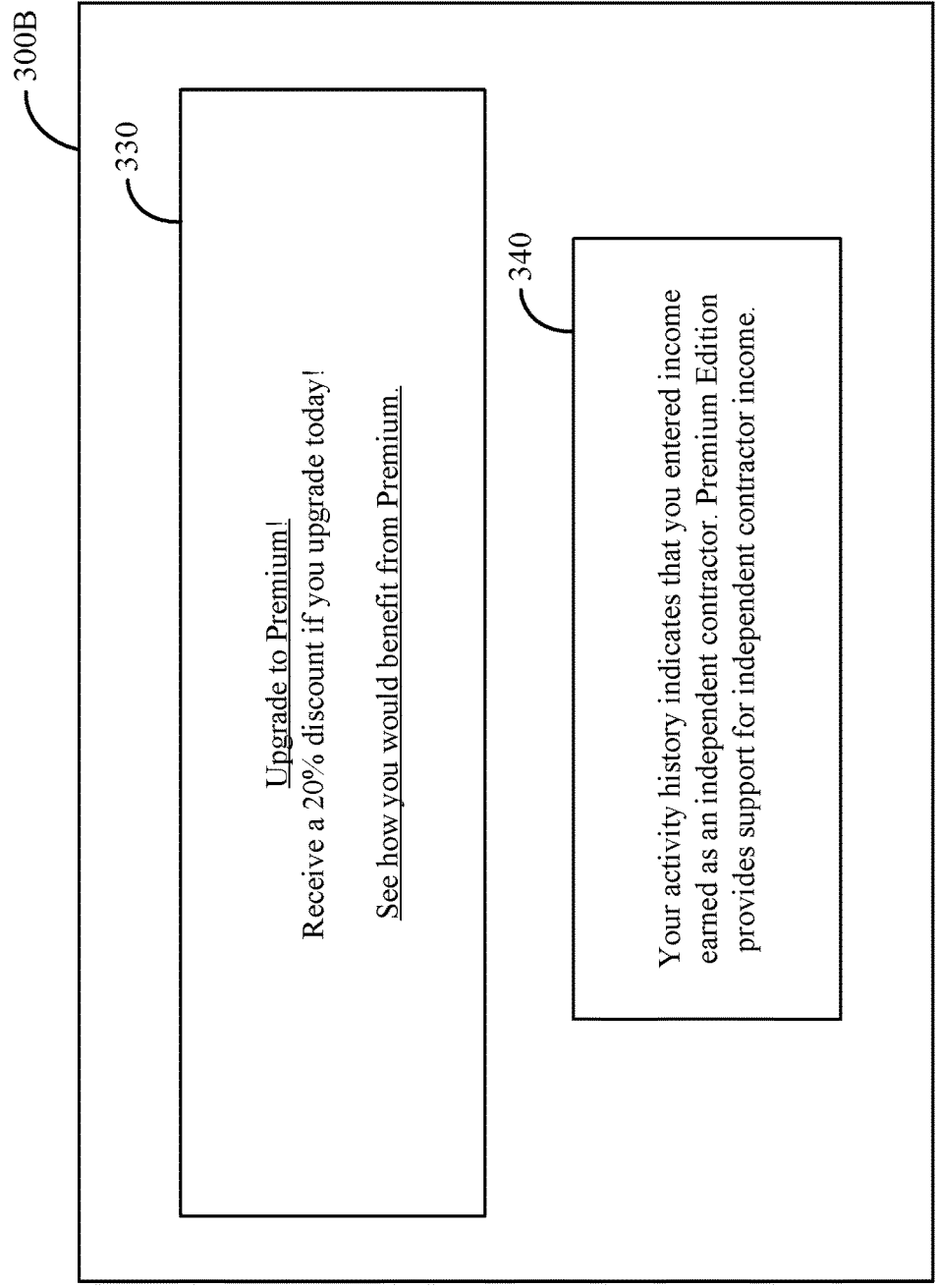
FIG. 3B depicts another example of providing content based on a behavior prediction.

FIG. 3B depicts another example of providing content to a user within a user interface 300B based on an explainable prediction determined using a HAT model. For example, the prediction may have been determined by HAT model 124 of FIG. 1 based on actions 142 of FIG. 1 as described above with respect to FIGS. 1 and 2.

In an embodiment, user interface 300B is accessed by a user on client 130 of FIG. 1, and corresponds to application 122 of FIG. 1. An offer 330 and an explanation 324 are provided within user interface 300B. Offer 330 and explanation 340 may correspond to content/explanation 144 of FIG. 1, and may be provided to client 130 from server 120 of FIG. 1 based on actions 142 of FIG. 1. For example application 122 of FIG. 1 may have determined to provide offer 330 based on a prediction output from HAT model 124 of FIG. 1 indicating that the user is likely to upgrade to another version of the application. Offer 330 includes the text "Upgrade to Premium! Receive a 20% discount if you upgrade today!" Clicking on the text "Upgrade to Premium" may launch a page for upgrading to a Premium edition of the application, on which a 20% discount may be automatically applied. Offer 330 also includes a link with the text "See how you would benefit from Premium" that, when activated by the user, causes explanation 340 to be displayed.

Explanation 340 includes explanatory text that is based on explanatory information (e.g., attention scores) output by the HAT model. Explanation 340 states "Your activity history indicates that you entered income earned as an independent contractor. Premium Edition provides support for independent contractor income." For example, an attention score for an action indicating that the user entered income earned as an independent contractor may have been above a threshold. The explanatory text in explanation 340 may be automatically generated based on the attention score, such as using an explanation template.

Recommendation 310 with explanation 320 of FIG. 3A and offer 330 with explanation 340 of FIG. 3B represent examples of ways in which explainable predictions by a HAT model may be utilized to enhance an application. In other embodiments, an explainable prediction may be used to offer promotions, target advertisements, proactively correct problems, automatically initiate assisted support sessions, modify a user interface (e.g., to emphasize certain elements), send emails or other communications, and/or the like. In each of these embodiments, attention scores may allow predictions to be explained in order to provide transparency, such as by explaining to the user which actions and/or sessions contributed most to certain content being provided or certain actions being taken. Explainable predictions determined using a HAT model may also be used for planning and analysis. For example, a provider of an application may use explainable predictions for financial projections or to plan for future changes in user behavior.

For example, the HAT model can be viewed as sensitivity report of target label to user action. A provider of an application may want to investigate a target label, such as un-subscription from an application, using customer action sequences when users log into the application. By using HAT models, one can not only predict how many user may unsubscribe, but can also determine what user actions (e.g., clicks, page visits, and the like) contribute the most to the prediction. Accordingly, changes may be made to the application, such as to pages that contributed most to user un-subscription predictions, to mitigate the issue.

Example Operations for Behavior Prediction Using a HAT Model

Figure 4:
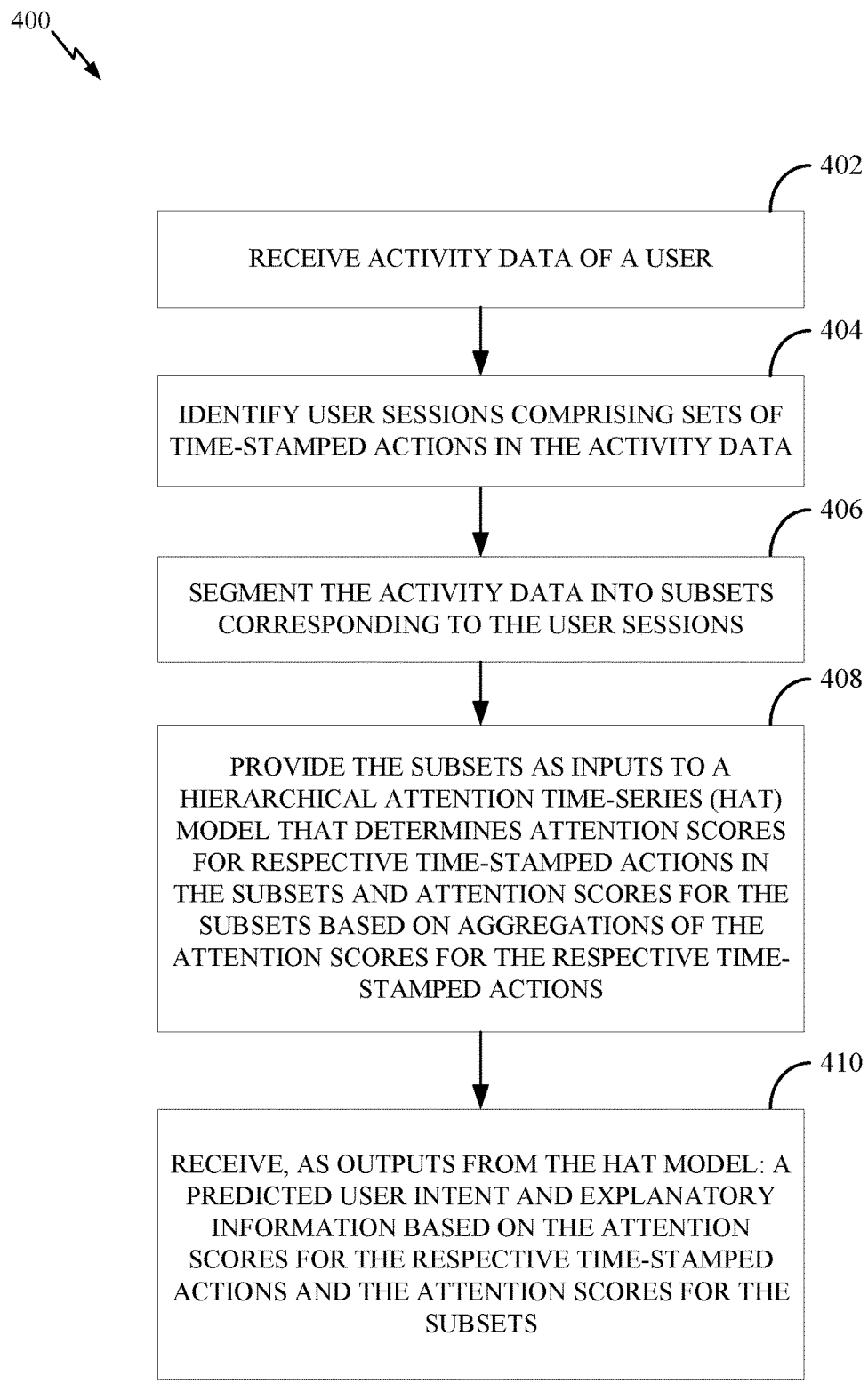
FIG. 4 depicts example operations for behavior prediction using a HAT model.

FIG. 4 depicts example operations 400 for behavior prediction using a HAT model. For example, operations 400 may be performed by application 122 of FIG. 1.

At step 402, activity data of a user is received. For example, application 122 of FIG. 1 may receive actions 142 from client 130 of FIG. 1. In certain embodiments, the activity data comprises a plurality of time-stamped actions performed by the user within application 122.

At step 404, user sessions comprising sets of time-stamped actions are identified in the activity data. In some embodiments, the activity data includes login and logout actions, and login actions are used to identify the beginning of a user session while logout actions are used to identify the end of a user session.

At step 406, the activity data is segmented into subsets corresponding to the user sessions identified at step 404. Each subset may include all actions that took place between a given login action and a given logout action delineating the beginning and end of a user session.

At step 408, the subsets are provided as inputs to a hierarchical attention time-series (HAT) model that determines attention scores for respective time-stamped actions in the subsets and attention scores for the subsets based on aggregations of the attention scores for the respective time-stamped actions. In one embodiment, the HAT model includes a first layer that determines attention scores for respective time-stamped actions in the subsets and a second layer that determines attention scores for the subsets based on aggregations of the attention scores for the respective time-stamped actions as described above with respect to FIG. 2. The attention scores may be used in one or more additional hidden layers of the HAT model (e.g., hidden layers 256 and 260 of FIG. 2A) to determine one or more predictions based on the actions and sessions.

In some embodiments, the HAT model may include an embedding layer that generates a multi-dimensional representation of each respective action in the sets of time-stamped actions.

Further, in some embodiments attention scores for actions and/or sessions may be computed in parallel in order to improve performance of the HAT model. For example, each of a plurality of neurons in the first layer may execute on a respective processing component of a plurality of processing components (e.g., which may be physical or software-implemented processing components).

At step 410, outputs are received from the HAT model. The outputs may include a predicted user intent and explanatory information based on the attentions scores for the respective time-stamped actions and the attention scores for the subsets. Certain actions may be performed based on the predicted user intent and the explanatory information. For example, content may be provided to the user based on the predicted user intent, a communication may be sent to the user based on the predicted user intent, a user interface may be modified based on the predicted user intent, and/or the user may be provided with explanatory text based on the explanatory information as described above with respect to FIG. 3. The explanatory text may identify which aspects of the activity data contributed most to the predicted user intent, such as to provide transparency and build trust with the user.

Example Operations for Training a HAT Model

Figure 5:
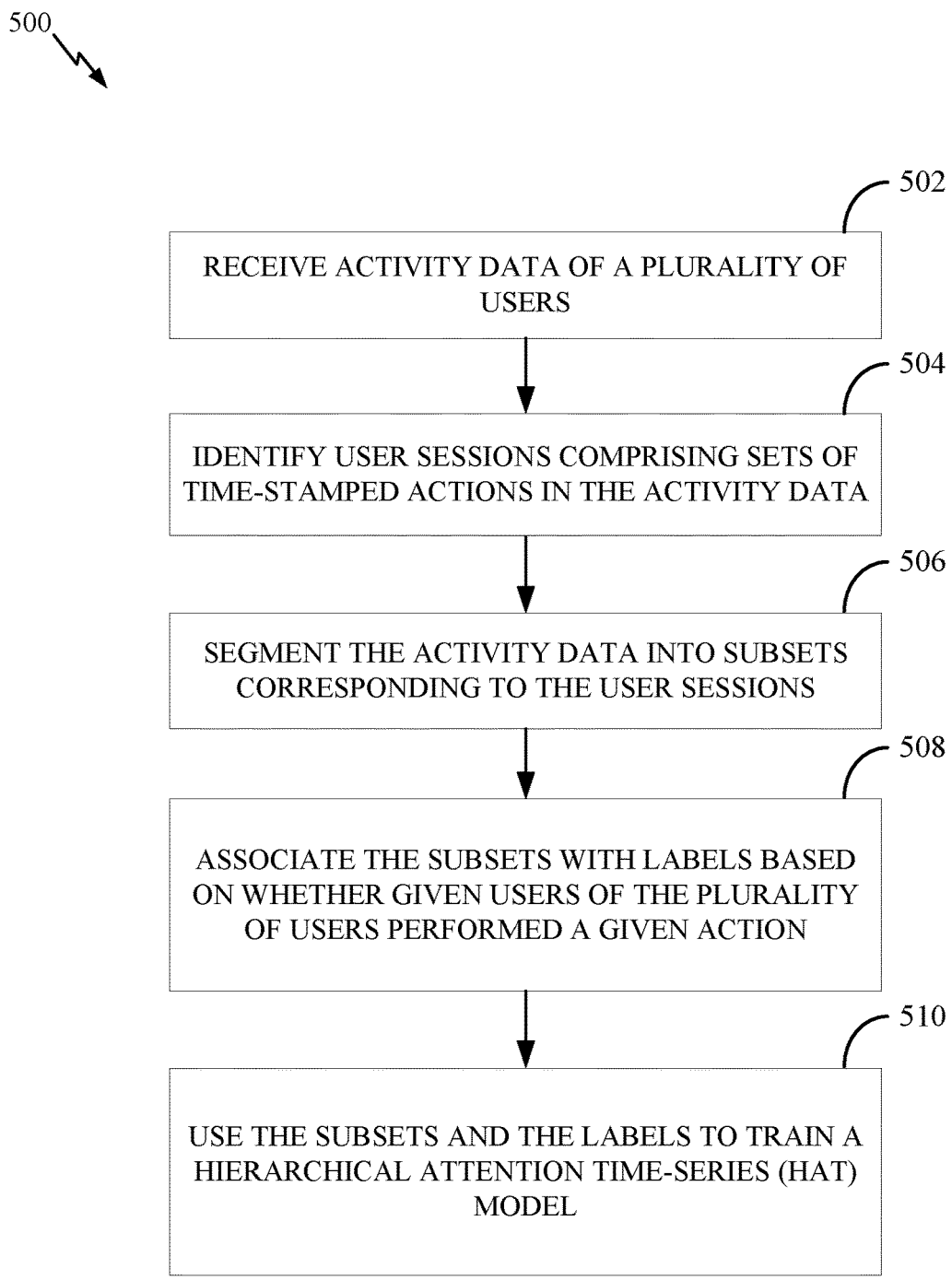
FIG. 5 depicts example operations for training a HAT model.

FIG. 5 depicts example operations 500 for training a HAT model. For example, operations 400 may be performed by trainer 128 of FIG. 1, by application 122 of FIG. 1, or by another component, such as on a separate system from server 120 of FIG. 1.

At step 502, activity data of a plurality of users is received. For example, a training component of application 122 of FIG. 1 may receive activity data from multiple users of the application, the activity data comprising a plurality of time-stamped actions performed by the plurality of users within application 122.

At step 504, user sessions comprising sets of time-stamped actions are identified in the activity data. In some embodiments, the activity data includes login and logout actions, and login actions are used to identify the beginning of a user session while logout actions are used to identify the end of a user session.

At step 506, the activity data is segmented into subsets corresponding to the user sessions that were identified at step 504. Each subset may include all actions that took place between a given login action and a given logout action delineating the beginning and end of a user session.

At step 508, the subsets are associated with labels based on whether given users of the plurality of users performed a given action. The given action corresponds to a potential output label of the HAT model.

For example, the given action may be purchasing a product. A subset of activity data for a user may be associated with a label indicating that the user purchased the product after performing the actions in the subset. Labels may be assigned by a user, such as an administrator or subject matter expert, or may be assigned automatically based on whether the given action appears in the activity data for the user. In some embodiments, additional features are included with the actions, such as user attributes. User attributes may include, for example, length of use of the application, geographic location, demographic data, and the like.

At step 510, the subsets and labels are used to train the HAT model. For example, parameters of the HAT model may be iteratively adjusted until outputs from the HAT model in response to given subsets of activity data match the labels associated with the given subsets. Once trained, the HAT model may be used to perform behavior prediction as described above. For example, the trained HAT model may be used to perform operations 400 of FIG. 4.

Results of Using a HAT Model for Behavior Prediction

In addition to providing improved accuracy and explainability for user behavior predictions, techniques described herein have resulted in substantial performance improvements. Experimental results indicate that the use of a hierarchical attention time-series (HAT) model as described herein results in faster computation time and lower overall training cost than alternatives such as logistic regression models, XGBoost models, and long short term memory (LSTM) models with and without attention mechanisms. For example, embodiments of HAT models may be four times faster to train than an embodiments of LSTM models trained to make the same prediction, and the trained LSTM models do not provide any explanatory information regarding their predictions. Experimental results are shown in the table below (where ROC AUC stands for receiver operating characteristic area under curve). ROC AUC is a standard machine learning metric to measure both a true positive rate (TPR) and a false positive rate (FPR) at the same time while considering the imbalance of labels in a dataset. The higher the value, the better the performance in both TPR and FPR. The optimal score is 1, while the least optimal is 0.5 (which indicates pure guessing).

The overall training cost is calculated using a standard cloud computing environment with an average hourly cost for using resources. Determining how long the computation time is for the same number of samples provides a rough estimation of the cost, disregarding the model differences. LSTM requires less parameters because it is a single sequential model. HAT models, on the other hand, break down a long action sequence into sessions resulting in multiple smaller sequences, and each smaller sequence can be computed in a parallel manner. Thus, the overall computation time is shorter for a HAT model than for LSTM. Another advantage of a HAT model over an LSTM model is that an LSTM model would require the entire user action sequence to be computed over and over whenever a user takes another step, which is computationally unpractical, while the HAT model does not require this repeated computation of the entire action sequence. A HAT model can precompute previous session action sequences and store them in a database (e.g., because history cannot be changed), such that the only new information is the latest session user action that needs to be calculated and fed into the upper level of the HAT model. This is several orders of magnitude faster and more efficient than using an LSTM model.

Storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Storage 610 comprises data store 620, which may be representative of data store 126 of FIG. 1. While data store 620 is depicted in local storage of system 600, it is noted that data store 620 may also be located remotely (e.g., at a location accessible over a network, such as the Internet). Data store 620 includes activity data 622, which may include time-stamped actions of users of application 614, as described above with respect to actions 128 and 142 of FIG. 1. Data store 620 further includes predictions 624 and explanations 626, which may represent outputs from HAT model 616 based on activity data 622. Data store 620 also includes content 628, which may include various types of content that may be provided to users of application 614 based on predictions 624 and explanations 626, such as help content, promotions, advertisements, user interface components, and the like.

Figure 6A:
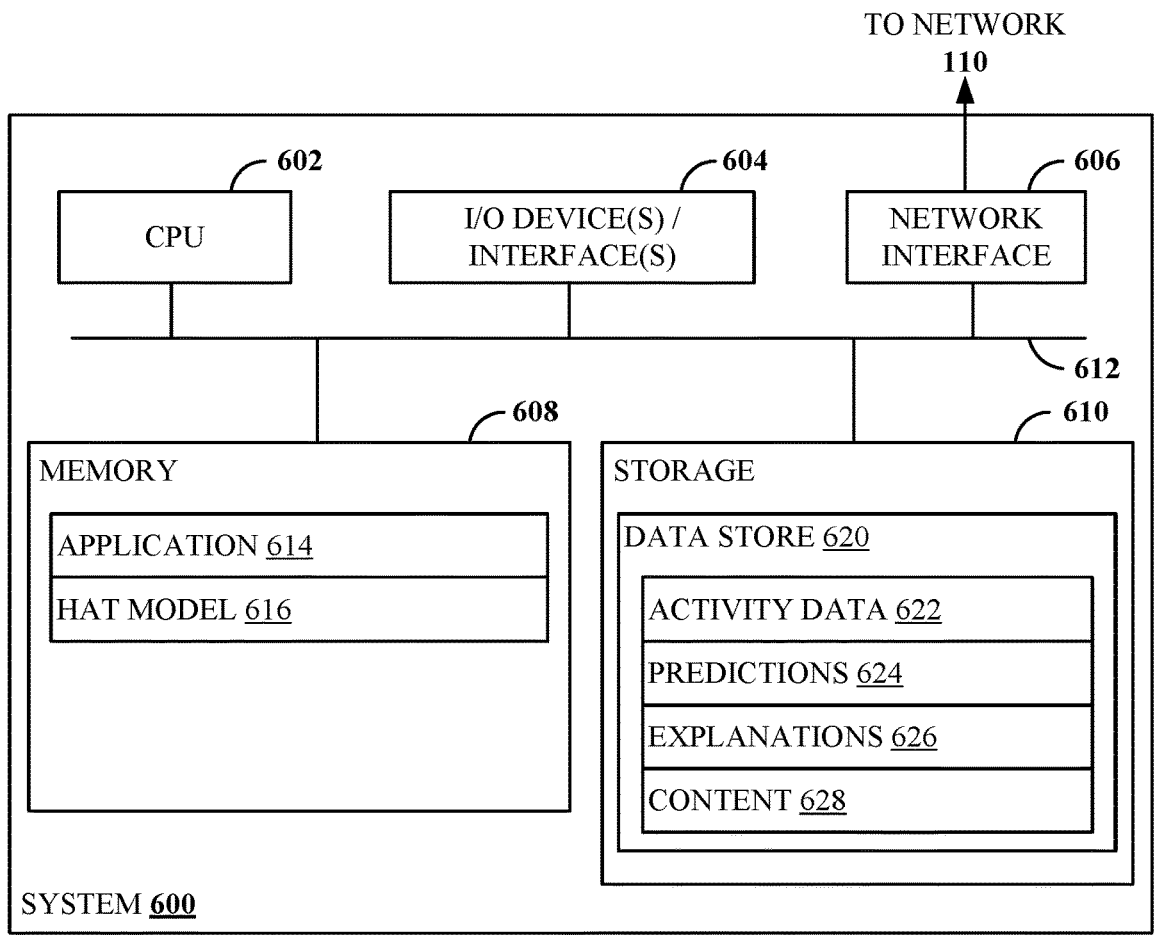
FIGS. 6A and 6B depict example processing systems for behavior prediction using a HAT model.
Figure 6B:
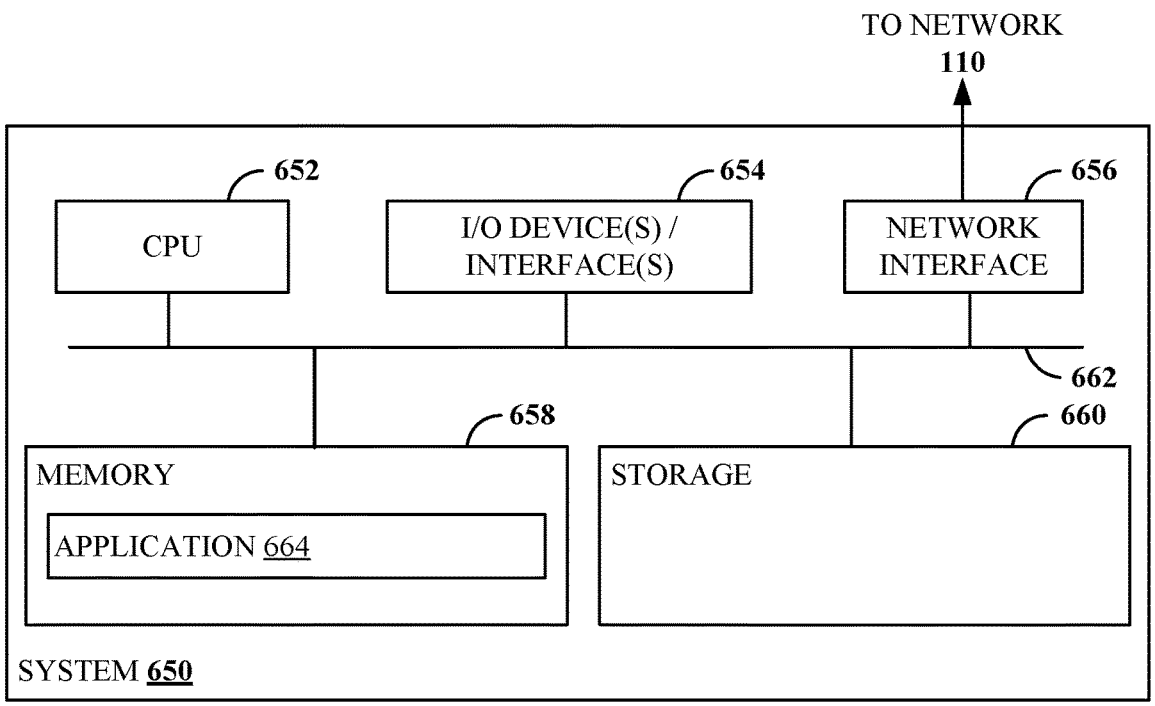

FIG. 6B illustrates another example system 650 with which embodiments of the present disclosure may be implemented. For example, system 650 may be representative of client 130 of FIG. 1.

| Model | ROC AUC | # Parameters | Computation Time | Overall Training Cost |
| --- | --- | --- | --- | --- |
| Logistic Regression | 0.62 | 251 | 10 s | ~$0.002 |
| XGBoost | 0.64 | ~3k | ~60 s | ~$0.01 |
| LSTM w/o Attention | 0.69 | ~11k | 2 ms/sample | ~$0.5 |
| LSTM w/Attention | 0.71 | ~12k | 2 ms/sample | ~$0.5 |
| Hierarchical w/o Attention | 0.69 | ~38k | 0.5 ms/sample | ~$0.1 |
| Hierarchical w/Attention (HAT model) | 0.71 | ~40k | 0.5 ms/sample | ~$0.1 |

Example Computing System

FIG. 6A illustrates an example system 600 with which embodiments of the present disclosure may be implemented. For example, system 600 may be representative of server 120 of FIG. 1.

System 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612. It is contemplated that one or more components of system 600 may be located remotely and accessed via a network. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements.

Additionally, the memory 608 is included to be representative of a random access memory. As shown, memory 608 includes application 614 and HAT model 616, which may be representative of application 122 and HAT model 124 of FIG. 1.

System 650 includes a central processing unit (CPU) 652, one or more I/O device interfaces 654 that may allow for the connection of various I/O devices 654 (e.g., keyboards, displays, mouse devices, pen input, etc.) to the system 650, network interface 656, a memory 658, storage 660, and an interconnect 662. It is contemplated that one or more components of system 650 may be located remotely and accessed via a network. It is further contemplated that one or more components of system 650 may comprise physical components or virtualized components.

CPU 652 may retrieve and execute programming instructions stored in the memory 658. Similarly, the CPU 652 may retrieve and store application data residing in the memory 658. The interconnect 662 transmits programming instructions and application data, among the CPU 652, I/O device interface 654, network interface 656, memory 658, and storage 660. CPU 652 is included to be representative of a single CPU, multiple CPUs, a single CPU having multiple processing cores, and other arrangements.

Additionally, the memory 658 is included to be representative of a random access memory. As shown, memory 658 includes an application 664, which may be representative of a client-side component corresponding to the server-side application 614 of FIG. 6A. For example, application 664 may comprise a user interface through which a user of system 650 interacts with application 614 of FIG. 6A. In alternative embodiments, application 614 is a standalone application that performs behavior prediction as described herein.

Storage 660 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving, by an application, activity data of a user;
   identifying, by the application, user sessions comprising sets of time-stamped actions in the activity data;
   segmenting, by the application, the activity data into subsets corresponding to the user sessions based on application login and application logout actions indicated in the activity data, wherein each user session of the user sessions begins with an application login action and ends with an application logout action;
   providing, by the application, the subsets as inputs to a hierarchical attention time-series (HAT) model that comprises:
      a first layer that determines attention scores for respective time-stamped actions in the subsets; and
      a second layer that determines attention scores for the subsets based on aggregations of the attention scores for the respective time-stamped actions,
   wherein the HAT model has been trained through a machine learning process in which parameters of the HAT model were iteratively adjusted based on labeled training data determined from historical user sessions, and
   wherein the attention scores for the respective time-stamped actions in the subsets are computed in parallel via respective neurons in the first layer of the HAT model that run on a plurality of processing components, wherein each respective neuron of the respective neurons runs on a separate processing component of the plurality of processing components and computes a respective attention score of the attention scores;
   receiving, by the application, as outputs from the HAT model in response to the inputs:
      a prediction based on the subsets, the attention scores for the respective time-stamped actions, and the attention scores for the subsets; and
      explanatory information based on the attention scores for the respective time-stamped actions and the attention scores for the subsets; and
   providing based on the outputs from the HAT model, via a user interface:
      a communication that is based on the prediction; and
      explanatory text related to the prediction that is based on the explanatory information, wherein the explanatory text indicates a particular user session that contributed to the prediction.

2. The method of claim 1, further comprising performing, by the application, based on the outputs from the HAT model, one or more of:
   providing content to the user based on the prediction;
   sending a communication to the user based on the prediction; or
   modifying a user interface based on the prediction.

3. The method of claim 1, wherein identifying the user sessions comprises determining login and logout actions in the activity data.

4. The method of claim 1, wherein the explanatory information identifies which aspects of the activity data contributed most to the prediction.

5. The method of claim 1, wherein the HAT model further comprises an embedding layer that generates a multi-dimensional representation of each respective action in the sets of time-stamped actions.

6. A system, comprising: a processor; and a memory storing instructions that, when executed by the processor, cause the system to perform a method, the method comprising:
   receiving, by an application, activity data of a user;
   identifying, by the application, user sessions comprising sets of time-stamped actions in the activity data;
   segmenting, by the application, the activity data into subsets corresponding to the user sessions based on application login and application logout actions indicated in the activity data, wherein each user session of the user sessions begins with an application login action and ends with an application logout action;

providing, by the application, the subsets as inputs to a hierarchical attention time-series (HAT) model that comprises:
  a first layer that determines attention scores for respective time-stamped actions in the subsets; and
  a second layer that determines attention scores for the subsets based on aggregations of the attention scores for the respective time-stamped actions, wherein the HAT model has been trained through a machine learning process in which parameters of the HAT model were iteratively adjusted based on labeled training data determined from historical user sessions, and wherein the attention scores for the respective time-stamped actions in the subsets are computed in parallel via respective neurons in the first layer of the HAT model that run on a plurality of processing components, wherein each respective neuron of the respective neurons runs on a separate processing component of the plurality of processing components and computes a respective attention score of the attention scores;

receiving, by the application, as outputs from the HAT model in response to the inputs:
  a prediction based on the subsets, the attention scores for the respective time-stamped actions, and the attention scores for the subsets; and
  explanatory information based on the attention scores for the respective time-stamped actions and the attention scores for the subsets; and providing, based on the outputs from the HAT model, via a user interface:
  a communication that is based on the prediction; and
  explanatory text related to the prediction that is based on the explanatory information, wherein the explanatory text indicates a particular user session that contributed to the prediction.

7. The system of claim 6, wherein the method further comprises performing, by the application, based on the outputs from the HAT model, one or more of:
  providing content to the user based on the prediction;
  sending a communication to the user based on the prediction; or
  modifying a user interface based on the prediction.

8. The system of claim 6, wherein identifying the user sessions comprises determining login and logout actions in the activity data.

9. The system of claim 6, wherein the explanatory information identifies which aspects of the activity data contributed most to the prediction.

10. The system of claim 6, wherein the HAT model further comprises an embedding layer that generates a multi-dimensional representation of each respective action in the sets of time-stamped actions.

11. A method, comprising:
receiving activity data of a plurality of users;
identifying user sessions comprising sets of time-stamped actions in the activity data;
segmenting the activity data into subsets corresponding to the user sessions based on application login and application logout actions indicated in the activity data, wherein each user session of the user sessions begins with an application login action and ends with an application logout action;
associating the subsets with labels based on whether given users of the plurality of users performed a given action; and
training a hierarchical attention time-series (HAT) model through a machine learning process in which parameters of the HAT model are iteratively adjusted based on the subsets and the labels, wherein the HAT model comprises:
  a first layer that determines attention scores for respective time-stamped actions in the subsets;
  a second layer that determines attention scores for the subsets based on aggregations of the attention scores for the respective time-stamped actions; and
  an output layer configured to output:
    a prediction corresponding to the given action that is based on respective actions that are provided as inputs to the HAT model and outputs from the first layer and the second layer; and
    explanatory information based on the outputs from the first layer and the second layer wherein the explanatory information allows explanatory text to be provided via a user interface along with the prediction to indicate a particular user session that contributed to the prediction,
wherein the attention scores for the respective time-stamped actions in the subsets are computed in parallel via respective neurons in the first layer of the HAT model that run on a plurality of processing components, wherein each respective neuron of the respective neurons runs on a separate processing component of the plurality of processing components and computes a respective attention score of the attention scores.

12. The method of claim 11, wherein identifying the user sessions comprises determining login and logout actions in the activity data.

13. The method of claim 11, wherein the explanatory information identifies which aspects of the activity data contributed most to the prediction.

14. The method of claim 11, wherein the HAT model further comprises an embedding layer that generates a multi-dimensional representation of each respective action in the sets of time-stamped actions.

* * * * *